United States Patent

[11] 3,543,908

| [72] | Inventor | Peter Clive Holland<br>Stamford, England |
|---|---|---|
| [21] | Appl. No. | 724,003 |
| [22] | Filed | April 25, 1968 |
| [45] | Patented | Dec. 1, 1970 |
| [73] | Assignee | Mather & Platt Limited<br>Manchester, Lancashire, England<br>a British Company |

[54] TRANSFER MECHANISM FOR CONTAINER STICKS
3 Claims, 4 Drawing Figs.

[52] U.S. Cl. .................................................. 198/206,
198/30, 198/31, 198/33, 198/68
[51] Int. Cl. ........................................................ B65g 47/32
[50] Field of Search .......................................... 198/19-
—23, 24, 26, 28—31

[56] References Cited

UNITED STATES PATENTS

| 574,444 | 1/1897 | Nickerson | 198/22X |
| 620,820 | 3/1899 | Zies | 198/26X |
| 737,216 | 8/1903 | Forry | 198/22X |
| 778,366 | 12/1904 | Kennedy | 198/20X |
| 921,165 | 5/1909 | Ross | 198/20 |
| 1,261,691 | 4/1919 | Bunkley | 198/26X |
| 1,325,167 | 12/1919 | Olson | 198/21 |
| 2,081,441 | 5/1937 | Willshaw | 198/26 |
| 2,540,181 | 2/1951 | Zimpel | 198/23 |
| 2,616,550 | 11/1952 | Rowe | 198/20 |
| 2,710,104 | 6/1955 | Putnam | 198/26X |

OTHER REFERENCES

" Escapements for Automatic Parts Handling" by John G. Kay, Page 86 in the March, 1966 issue of Automation.

*Primary Examiner*—Richard E. Aegerter
*Assistant Examiner*—W. Scott Carson
*Attorney*—Holman, Glascock, Downing & Seebold

ABSTRACT: A continuously operating hydrostatic cooker having a mechanism for discharging container sticks from between the carrier beams of a cooker conveying mechanism onto a runway down which the sticks roll into contact with a stop at the runway exit which constitutes a locating means against which each container stick is adapted to abut to correct any misalignments. The stop is movable out of the path of the sticks to allow the sticks to roll onto a platform located between two discharge conveyors and movable to convey consecutive sticks alternately into either of the two conveyors.

3,543,908

TRANSFER MECHANISM FOR CONTAINER STICKS

This invention relates to apparatus for sterilizing, preserving, cooking or like apparatus (hereinafter and in the claims simply called "a hydrostatic cooker"), especially of the continuous processing type, through which articles containing materials to be processed are moved.

In a hydrostatic cooker the articles are generally cylindrical containers although they may be other than cylindrical which are moved through the cooker by a conveyor mechanism which carries and moves rows of containers, commonly called "container sticks." The conveyor mechanism is usually of endless construction comprising one or more chains, belts or the like mounting a series of parallel beams with adjacent beams spaced to support therebetween a container stick and to allow loading and discharge therebetween. Such a hydrostatic cooker is hereinafter and in the claims referred to ("a hydrostatic cooker of the type defined").

It is desirable to ensure that each container stick is discharged in a precise and controlled manner such that stick alinement is maintained. It is also desirable to ensure a relatively fast rate of discharge from the cooker.

It is an object of the present invention to provide a discharging mechanism which ensures these two factors.

SUMMARY OF THE INVENTION

According to the present invention there is provided a hydrostatic cooker of the type defined comprising a discharging mechanism for delivering sticks of containers out from between adjacent carrier beams of the cooker conveyor mechanism after processing and comprising a runway for receiving each container stick and arranged relative to the carrier beams such that the leading carrier beam of each conveyor stick serves initially to hold same in precise alinement as it moves along the runway until the beam is moved out of the path of the container stick, locating means against which each container stick is adapted to abut to correct any misalignments, and means for moving the locating means relative to the container stick to allow the latter to be received in a discharge conveyor.

An embodiment of the present invention will now be described, by way of example, with reference to the accompanying drawings, in which:

DETAILED DESCRIPTION OF THE INVENTION

The hydrostatic cooker will not be illustrated or described in detail since the construction and functioning of such cookers is well known.

Briefly, the hydrostatic cooker comprises a vertical casing of substantial height within which is housed an endless conveyor. The endless conveyor consists essentially of a pair of laterally spaced chains or other convenient endless flexible elements which are interconnected by a series of equispaced parallel beams, adjacent beams serving to support container sticks therebetween so that the container sticks are carried through the cooker for sterilizing purposes. The carrier beams may be disposed to one side only of the conveyor chains to give a single-sided conveyor, or they may be disposed at both sides of the conveyor chains to give a double-sided conveyor. The latter arrangement is preferred for economic reasons. An example of a preferred form of double-sided conveyor is a conveyor comprising a pair of laterally spaced chains with end plates between adjacent links which perform the function of preventing a row or stick of end-to-end cans from falling out the ends of the chains. Carrier beams of X-formation extend between the two chains and project from either side so that there is a duplicated arrangement of carrier beams on the chains. The X-shaped beams are detachable and may be provided in different sizes to accommodate different sized containers but it is to be noted that each size of carrier beam can accommodate differently sized containers. The carrier beams are each of general X-formation with a lip extending from each free end of the beam, and each pair of adjacent beams provides a space within which a stick of containers can be accommodated. Adjacent beams are constrained to flex apart at loading and discharge stations to permit feeding of sticks of containers between adjacent beams and also to permit sterilized containers to discharge from between the beams.

The endless conveyor has a vertically sinuous path of movement in the casing. The conveyor passes through a first water leg, a steaming chamber, a second water leg and a spray unit all of vertical disposition and disposed side-by-side. The two water legs perform the function of valves for retaining the steam within the steaming chamber. The first water leg is of relatively high temperature, and performs the secondary function of bringing the containers up to the temperature required for the steaming chamber. The second water leg is of relatively low temperature and performs the secondary function of gradually cooling the containers. The spray unit serves further to cool the containers and sprays are also provided along the top of a bottom horizontal run of the conveyor to further cool the containers.

Figure 1:
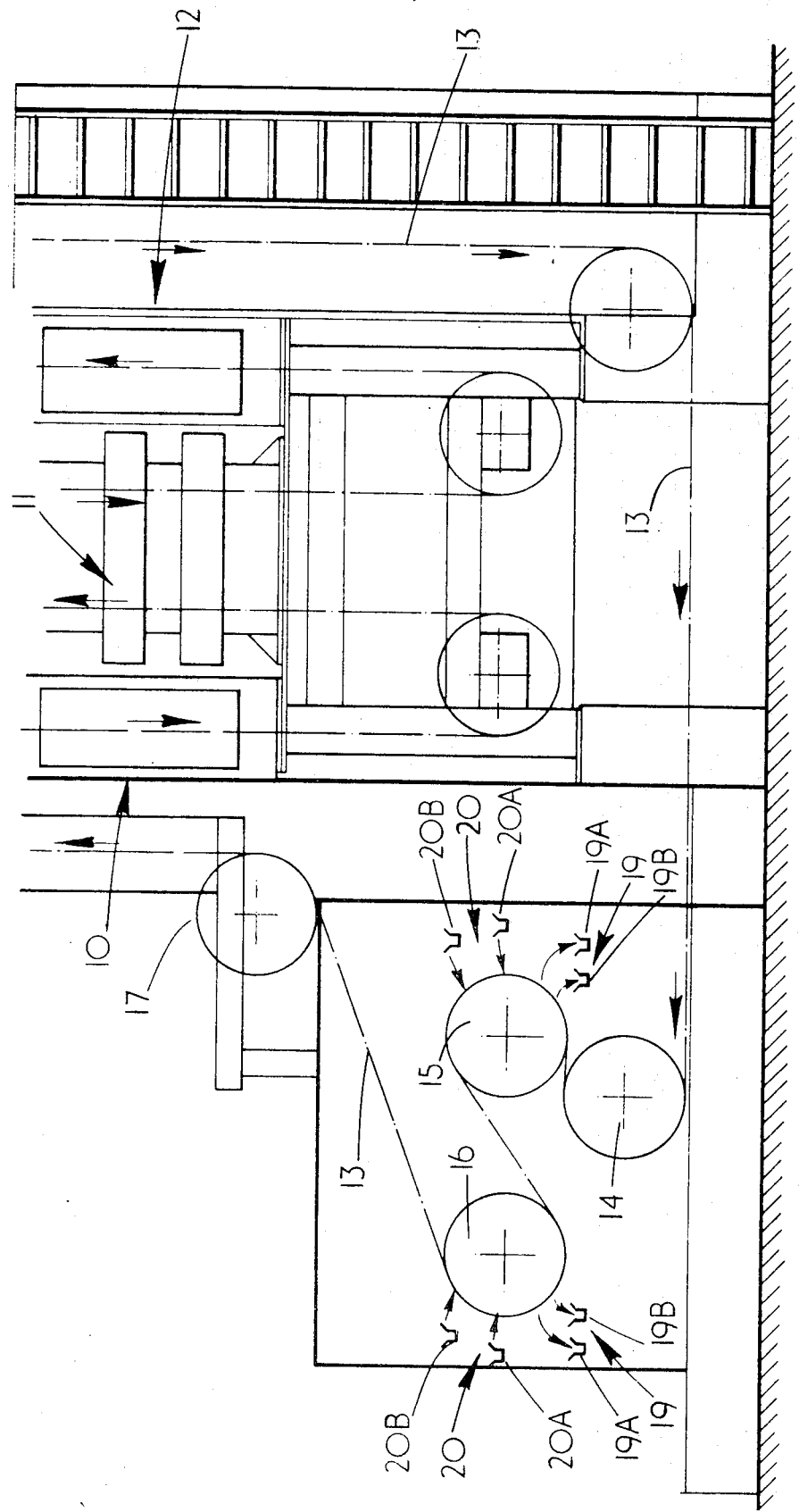
FIG. 1 is a diagrammatic view of the bottom of a hydrostatic cooker in accordance with the present invention.

Referring to FIG. 1, there is shown diagrammatically the bottom section of a cooker. The first water leg is generally indicated at 10, the steaming chamber at 11 and the second water leg at 12. The endless conveyor is indicated at 13 and is of the construction above described. It will be seen that the conveyor, after its final vertical run, has a bottom horizontal run and then passes in turn around a sprocket wheel 14, a sprocket wheel 15 and a sprocket wheel 16 and finally a sprocket wheel 17 before it enters its first vertical run through the cooker.

Figure 2:
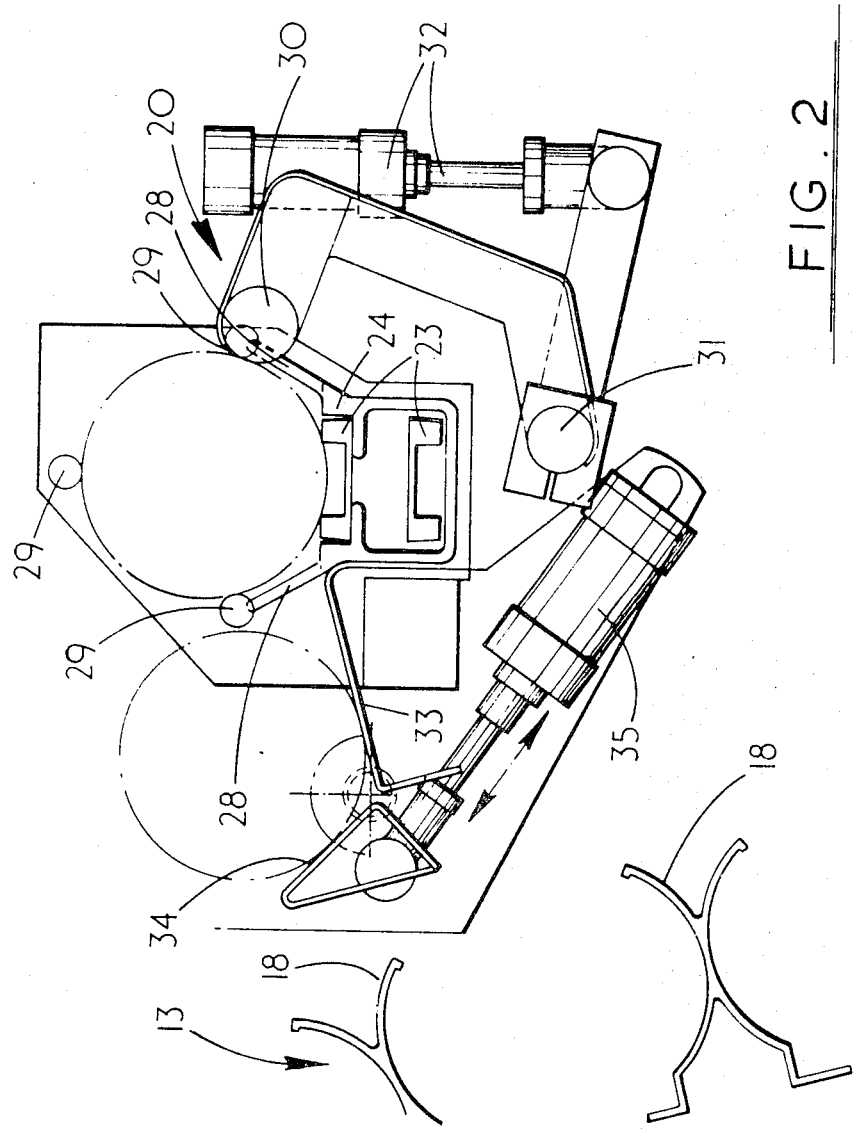
FIG. 2 is a side view of a loading station of the cooker.
Figure 4:
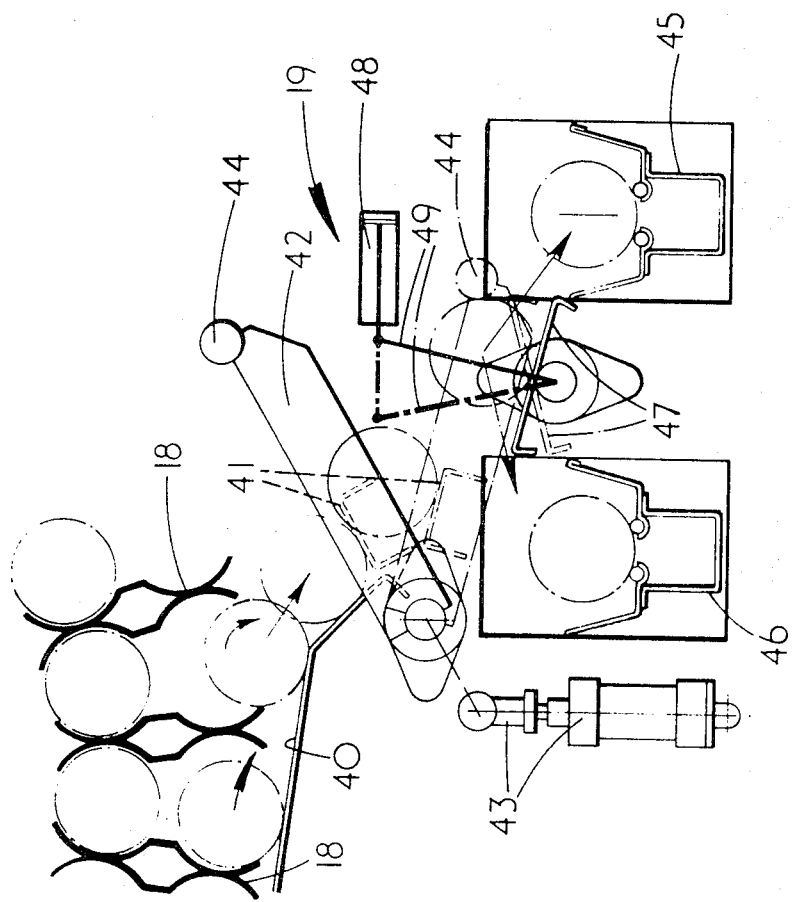
FIG. 4 is a side view of a discharge station of the cooker.

Sprocket wheels 15 and 16 are dimensioned to causing flexing apart of beams 18 of the conveyor 13 at the discharge and loading stations (see FIGS. 2 and 4).

In the present example, there is a discharge station 19 at each sprocket wheel 15 and 16, and a loading station 20 at each sprocket wheel 15 and 16. Each discharge and loading station is of double arrangement, that is there is a facility at each station for two discharges or two loadings as the case may be. It is envisaged that there may only be a single discharge station and a single loading station provided, especially if a single sided conveyor is employed.

In the present invention, there is discharge and loading of one side of the conveyor at sprocket wheel 15 and discharge and loading of the other side of the conveyor at sprocket wheel 16.

Each loading station 20 has two identical loading mechanisms 20A and 20B, each of which loads alternate carrier spaces between beams 18.

Figure 3:
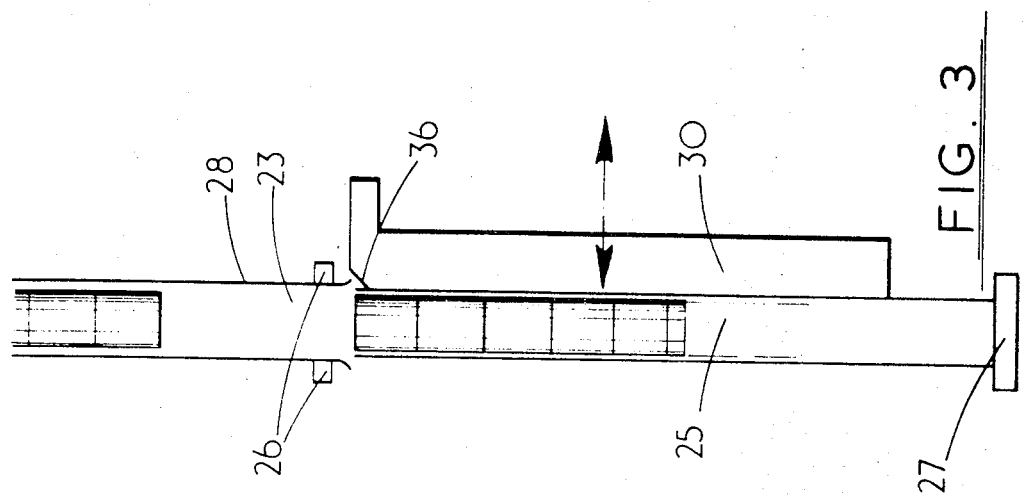
FIG. 3 is a diagrammatic plan view of the loading station.

Each loading mechanism has a supply of containers delivered thereto by any convenient form of conveying system. The mechanism has a horizontally disposed endless belt 23 (FIG. 2) for building up a stick of containers of predetermined length and/or number. The belt 23 runs in a trough 24 and delivers containers end-to-end into a buildup region 25 (FIG. 3).

A photoelectric cell detector 26 is provided at the exit end of the endless belt 23 adjacent the entry of the buildup region 25. A position adjustable stop 27 is provided in the buildup region to assist in building up the required container sticks. The position of stop 27 is determined by the length of container stick, and/or the number of containers in each stick, and/or the container size.

The tough 24 has at each side an upstanding wall 28 (FIG. 2) for preventing lateral discharge of containers off the belt 23. These walls 28 terminate at a distance from the exit end of conveyor belt 23 and are replaced by three guide rods 29, one at each side of the trough 24 and one above the trough 24. The top guide rod 29 is position adjustable to accommodate containers of different diameters. The guide rods 29 terminate at the exit end of belt 23.

The container buildup region 25 is disposed between the conveyor 13 and a pusher bar 30. The pusher bar 30 is pivotal about a shaft 31 (FIG. 2) and its movements are controlled by a pneumatic ram 32.

A downwardly extending runway 33 is located between the belt conveyor 23 and the conveyor 13, and has at its end adjacent the conveyor 13 a normally open gate 34 which forms an extension of the runway. The gate 34 is actuable by a pneumatic ram 35 for movement between its open and closed positions.

The pusher bar 30 at its end adjacent the exit end of endless belt 23 is chamfered as indicated at 36 (FIG. 3) for a purpose hereinafter mentioned.

The photoelectric cell detector 26 and pneumatic rams 32 and 35 are part of an electropneumatic control circuit which also includes a timing cam (not shown). The circuitry in itself is not considered novel, and the individual components and functioning thereof are well known to skilled persons. For this reason, the circuitry is not illustrated and is described in brief.

A row of containers in end-to-end relationship is delivered by the belt conveyor 23 on to the buildup region 25, the containers being guided firstly by the tough walls 28 and then the rods 29. As each container passes the photoelectric cell detector 26 it momentarily interrupts the detector beam, with the spatial delivery of the containers ensuring that the interruption is momentary. As, however, the container stick builds up lengthwise a time will occur when the interruption is no longer momentary and actuation of the pusher bar 30 should occur. However, loading of a container stick must be in synchronism with the presentation at the loading mechanism of adequately flexed-apart carrier beams 18 and such presentation is controlled by the timing cam operating a microswitch of the electropneumatic circuitry. If the microswitch is operated simultaneously with interruption of the detector beam (other than momentary interruption) then the circuitry is operated to actuate pneumatic ram 32 to move pusher bar 30 into contact with the container stick and cause the stick to leave the endless belt 23 laterally and move down runway 33, with its movement being arrested by the gate 34. The containers of each stick are thus alined by the gate 34 to correct any misalinements resulting from the free rolling of the container stick down the runway 33. When a pair of correctly flexed apart beams 18 move into the loading position, the gate 34 is moved by its ram 35 into its open position under the control of the timing cam, and the alined container stick rolls into the space between the beams 18. Movement of the conveyor 13 along its path closes the beams 18 about the stick and moves the stick through the hydrostatic cooker for processing until it is to be discharged.

It is important to note that movement of a container stick from the endless belt 23 to the main conveyor 13 is only effected if the carrier beams are correctly presented to the loading mechanism and if the container stick is of predetermined length and/or number.

The chamfer 36 on the pusher bar 30 ensures that when a container stick is pushed down the runway 33 by the pusher bar 30, the next adjacent container is moved slightly back along the belt conveyor 23 towards its inlet end thus ensuring avoidance of damage or interference to the container, pusher bar 30 and conveyor 23 and its guide rods 29.

If the conveyor 13 is running relatively fast, the container stick on opening of the gate 34 will abut against the lip of the carrier beam 18 coming up into alinement with runway 33 until the opening between the two carrier beams 18 is in alinement with the runway 33. The container stick then rolls into the space between the adjacent carrier beams. If, however, the conveyor 13 is running relatively slow, the gate 34 at the end of the runway 33 is held in its upright closed position until the space between adjacent beams is in correct alinement therewith. The gate then pivots down under the action of the pneumatic ram 35 and the container stick runs over the gate 34 into the space between the adjacent beams 18.

It will be seen from FIGS. 1 and 2 that each loading station has two loading mechanisms, the lower of which commences its loading action before the upper which commences its loading action before termination of the loading action of the lower mechanism.

There is thus provided a loading mechanism for use in a hydrostatic cooker which ensures a correct and uniform loading of the conveyor 13 with balanced weight distribution.

Reference is now made to the discharge stations of the hydrostatic cooker.

At each discharge station adjacent carrier beams 18 flex open and the stick of containers projects outwardly into contact with a runway 40 (FIG. 4). The container stick is held in precise alinement as it moves down runway 40 by the lip of the leading beam 18 until the latter is moved upwardly out of contact with the container stick which rolls into contact with a stop plate 41 carried by pivotal arms 42 which are pivoted by a pneumatic ram 43 operated by the electropneumatic circuitry actuated by a microswitch and the timing cam (both not shown). The arms 42 are interconnected at their ram-remote ends by an abutment rod 44.

Two discharge conveyors 45 and 46 are disposed below the arms 42 in spaced side-by-side relationship. A pivotal platform 47 is located between the conveyors 45 and 46 and is pivotal about its center from one inclined position in which it is directed towards the conveyor 45 to another inclined position in which it is directed towards the conveyor 46. The pivotal movement of the platform 47 is effected by a pneumatic ram 48 and linkage 49 operated by the timing cam and microswitches.

When a container stick abuts stop plate 41 the arms 42 are in their upper position so that when the arms 42 are caused to pivot downwardly by the ram 43 the container stick falls on to platform 47 as shown and abuts the rod 44. When the arms 42 are moved upwardly again by the ram 43 the abutment rod 44 is moved out of the path of the container stick which then falls into the discharge conveyor 45.

If, however, the platform 47 is inclined in the opposite direction by the ram 48 so that it is inclined downwardly towards the discharge conveyor 46 then when the arms 42 are lowered the container stick rolls on to platform 47 and abuts against stop plate 41 so that raising of the arms 42 lift the stop plate clear of the container stick which rolls into discharge container 46.

Thus the platform 47 is controlled by the ram 48 to direct container sticks alternately into conveyors 45 and 46.

There is provided as a result of the present invention a discharge mechanism which controls alinement of the conveyor sticks and delivers them to alternate discharge conveyors thus giving a relatively high rate of discharge.

It is to be noted that the spacing between the runway 40 and the outer ends of the carrier beams 18 is selected so that jamming of the conveyor 13 will not occur if one or more containers are inadvertently carried around past the discharge station by the conveyor.

I claim:

1. A hydrostatic cooker of the type defined comprising a discharging mechanism for delivering sticks of containers out from between adjacent carrier beams of a cooker conveyor mechanism after processing and including a runway for receiving each conveyor stick and arranged relative to the carrier beams so that the leading carrier beam of each conveyor stick serves initially to hold same in precise alinement as it moves along the runway until the beam is moved out of the path of the container stick, a stop plate at the runway exit end constituting a locating means against which each container stick is adapted to abut to correct any misalignments, pivotal arms carrying the stop plate, means operable to move the arms for moving the stop plate out of the path of the container stick, two spaced apart discharge conveyors, an inclined platform onto which the conveyor stick is delivered and held when the stop plate is moved out of its path until the stop plate is returned to its original position, and means pivotally mounting the inclined platform between the two discharge conveyors for pivotal movement to opposite inclined positions for delivering alternate container sticks to different discharge conveyors.

2. The cooker as claimed in claim 1, in which the pivotal arms carrying the stop plate mounts at their ends an abutment rod so that when a container stick is delivered on to the platform it is prevented from rolling into one of the discharge conveyors by either the stop plate or abutment rod depending on the direction in which the platform is inclined until the arms are moved to lift the stop plate and abutment rod clear of the container stick.

3. The cooker as claimed in claim 1, in which the platform is pivoted by a fluid-operated ram.

UNITED STATES PATENT OFFICE
CERTIFICATE OF CORRECTION

Patent No. 3,543,908           Dated December 1, 1970

Inventor(s) Peter Clive Holland

It is certified that error appears in the above-identified patent and that said Letters Patent are hereby corrected as shown below:

Claim 1, line 5, "conveyor" should read --container--;

line 6, "conveyor" should read --container--;

Signed and sealed this 19th day of September 1972.

(SEAL)
Attest:

EDWARD M. FLETCHER, JR.                ROBERT GOTTSCHALK
Attesting Officer                      Commissioner of Patents